United States Patent [19]
Kita et al.

[11] Patent Number: 6,008,594
[45] Date of Patent: Dec. 28, 1999

[54] DISCHARGE LAMP LIGHTING CONTROLLER AND DISCHARGE LAMP SOCKET APPLIED TO THE SAME

[75] Inventors: Masahide Kita; Kenji Nakamura; Masahiro Yabuta, all of Tokyo, Japan

[73] Assignee: Mitsubishi Denki Kabushiki Kaisha, Tokyo, Japan

[21] Appl. No.: 09/116,248

[22] Filed: Jul. 16, 1998

[30]     Foreign Application Priority Data

Jan. 7, 1998    [JP]    Japan ................................. 10-001896

[51] Int. Cl.[6] .................................................. H05B 37/02
[52] U.S. Cl. .................... 315/307; 315/247; 315/DIG. 7; 315/292; 315/316
[58] Field of Search ............................. 315/247, DIG. 7, 315/307, 292, 316

[56]             References Cited

U.S. PATENT DOCUMENTS 4,277,728    7/1981    Stevens ..................................... 315/247

FOREIGN PATENT DOCUMENTS

| 4-233198 | 8/1992 | Japan . |
| 5-217680 | 8/1993 | Japan . |
| 7-45376 | 2/1995 | Japan . |

OTHER PUBLICATIONS

Greenfield "Using Microprocessors & Microcomputers: The 6800 Family" 1981 p. 10.

*Primary Examiner*—Michael B Shingleton

[57]                    ABSTRACT

A discharge lamp lighting controller that detects the voltage applied to a discharge lamp used by a vehicle, for example, and stops power supply to the discharge lamp if the voltage goes out of an estimated rated voltage range in a design stage. Circuit components are protected from possible impairment due to excessive current that may flow depending on the state of the discharge lamp under the constant power control of the discharge lamp.

7 Claims, 8 Drawing Sheets

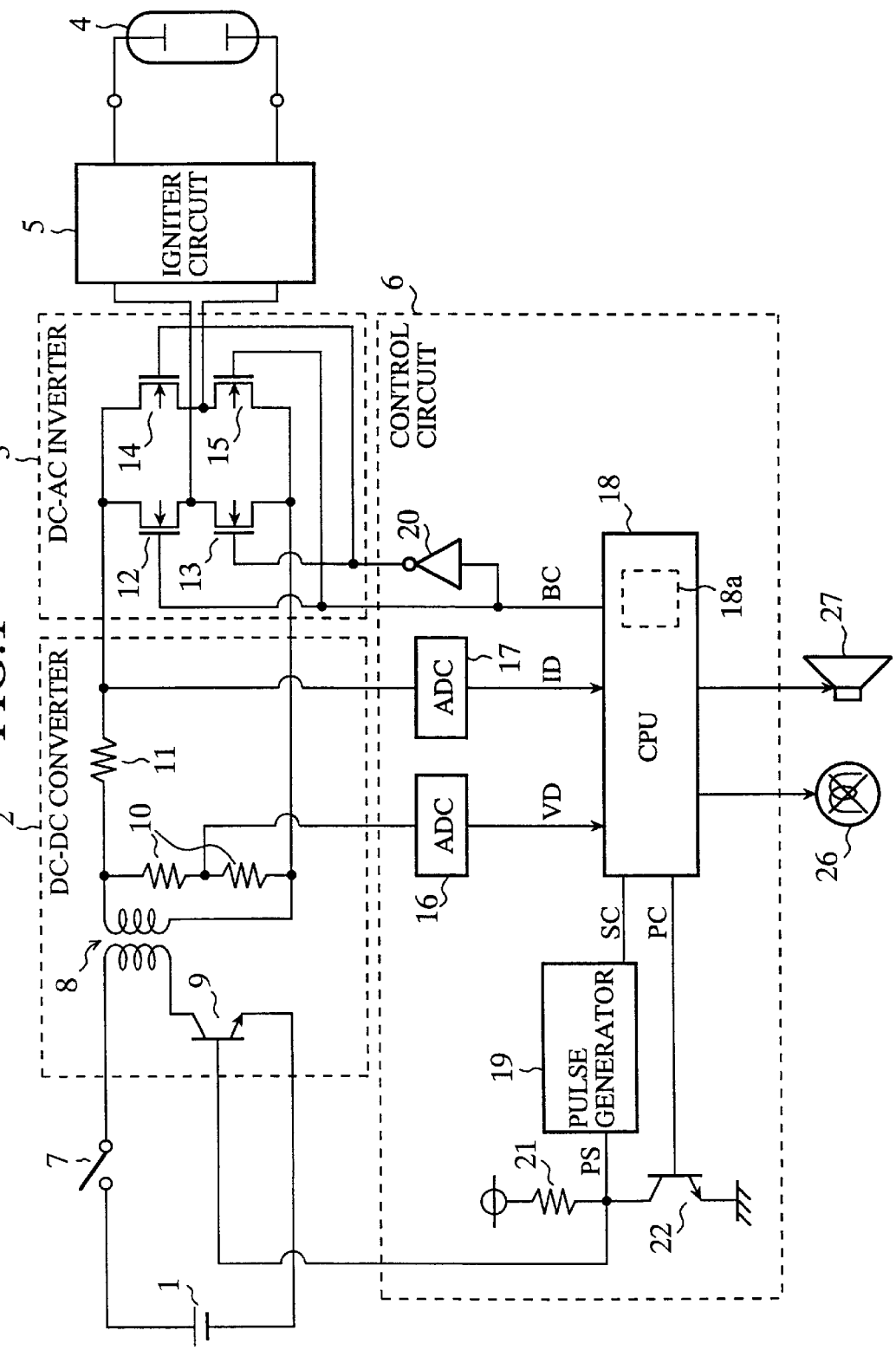

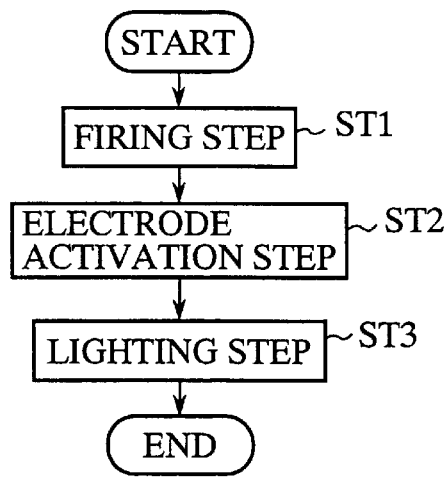
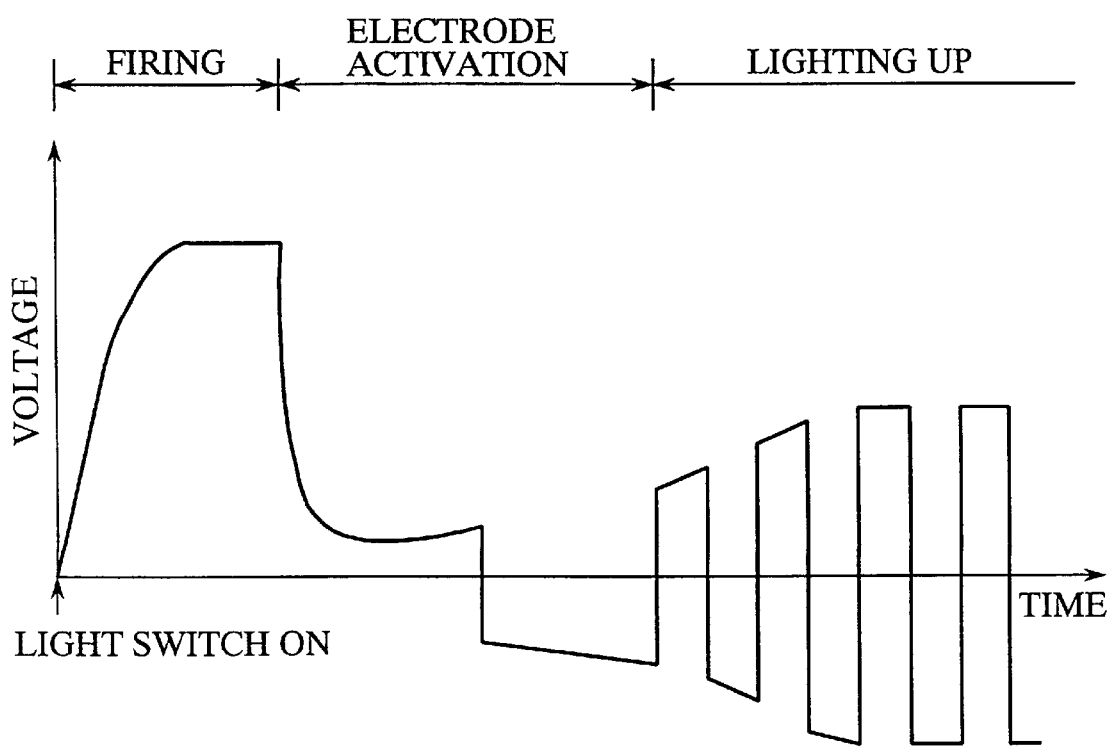

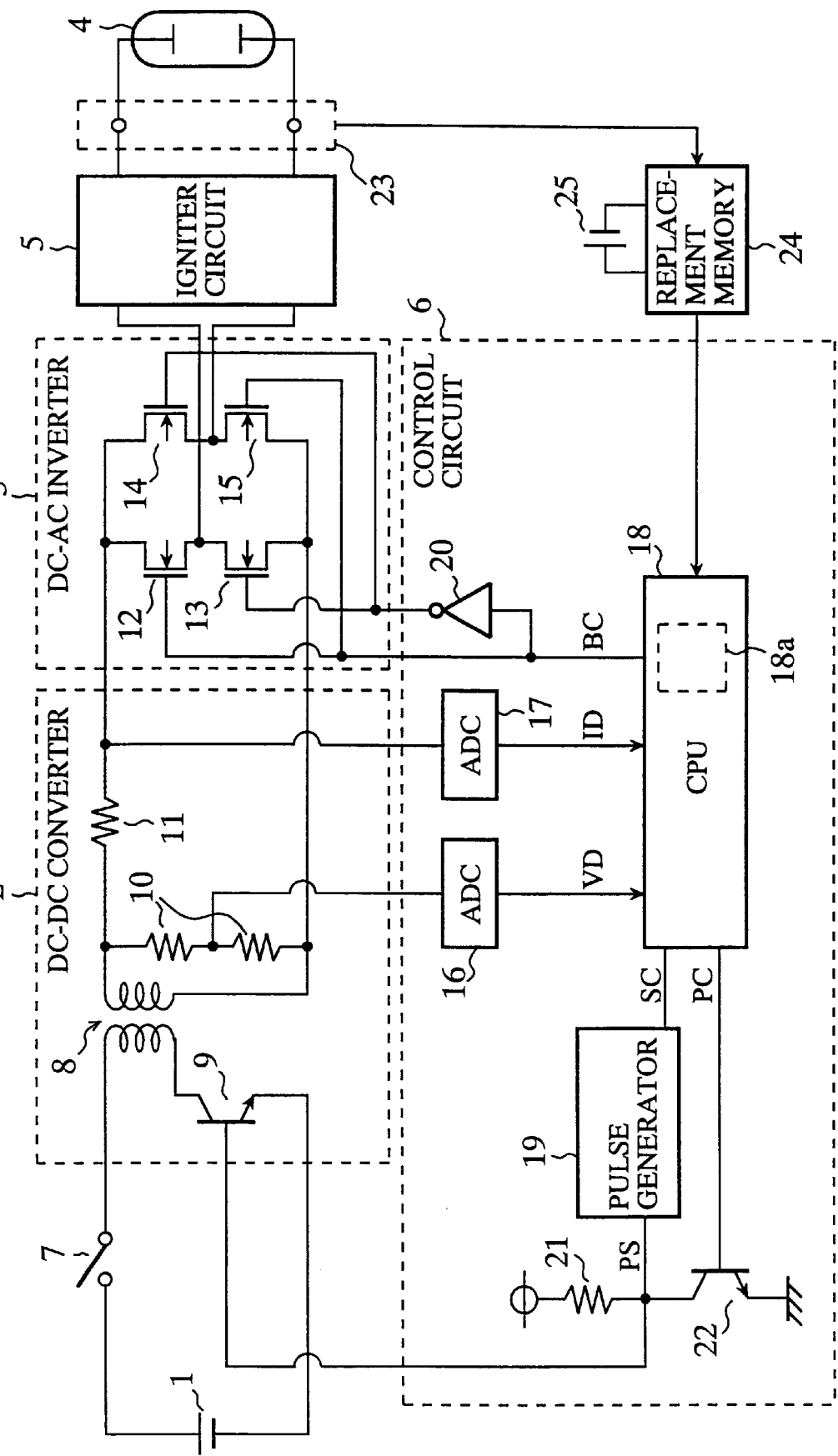

6,008,594

DISCHARGE LAMP LIGHTING CONTROLLER AND DISCHARGE LAMP SOCKET APPLIED TO THE SAME

BACKGROUND OF THE INVENTION

1. Field of the Invention

The present invention relates to a discharge lamp lighting controller and a discharge lamp socket used for a discharge lamp that emits light by the discharge accompanying gas breakdown, and particularly to those preferably applied to discharge lamps used as headlights of a vehicle such as an automobile.

2. Description of Related Art

Conventionally, halogen lamps, in which halogenated gas is filled between electrodes, are widely used as headlights of a vehicle. The halogen lamps have an advantage of being able to emit higher density luminous flux more effectively than filament lamps. Recently, attempts have been made to use as headlights of a vehicle instead of the halogen lamps discharge lamps such as high-voltage sodium-vapor lamps and metal halide lamps which have been used as streetlights because discharge lamps can emit even higher density luminous flux than the halogen lamps when driven at a fixed amount of power.

FIG. 16 is a block diagram showing a conventional discharge lamp lighting controller and its peripheral circuits disclosed in Japanese patent application laid-open No. 4-26002. In FIG. 16, the reference numeral 1 designates a DC power supply such as a battery mounted on a vehicle; 2 designates a DC-DC converter for multiplying a power supply voltage from the DC power supply 1 to output a high voltage; 3 designates a DC-AC inverter for converting the high voltage to an AC voltage; 4 designates a discharge lamp to which the AC voltage is applied; 5 designates an igniter circuit provided between the DC-AC inverter 3 and discharge lamp 4 for generating a very high voltage by further boosting the high voltage for firing the discharge lamp 4; 6 designates a control circuit for controlling the DC-DC converter 2 to supply the discharge lamp 4 with a fixed amount of power; and 7 designates a headlight switch connected between the DC power supply 1 and the DC-DC converter 2.

Next, the operation of the conventional system will be described.

When the headlight switch 7 is turned on, the power supply voltage is fed to the DC-DC converter 2. The DC-DC converter 2 multiplies it to the high voltage which passes through the DC-AC inverter 3 which is initially at rest. The igniter circuit 5 further boosts the high voltage and applies it to the discharge lamp 4. This causes breakdown between the electrodes of the discharge lamp 4, thus emitting light involved in arc discharges.

Once the breakdown has occurred, the igniter circuit 5 stops and the DC-AC inverter 3 starts its operation so that the discharge lamp 4, which is supplied with high AC power, continues its emission of light. In this steady state, the control circuit 6 regulates the lamp current supplied from the DC-DC converter 2 to the discharge lamp 4 such that it emits light at a fixed amount of power. This is carried out in the expectation that its life will be prolonged.

The conventional discharge lamp lighting controller with such an arrangement has a problem in that a lamp current more than a rated current which was estimated at the design stage can flow through the DC-DC converter 2 and DC-AC inverter 3.

This is because there are sometimes more than estimated variations in the amount of gas filled in the tube of the discharge lamp 4, and in addition the gas can be gradually discharged from the tube. If the lamp voltage of the discharge lamp 4 reduces owing to these factors, a current more than the rated current will flow. Leaving the discharge lamp 4 in this state will cause an excessive current to continue flowing through the discharge lamp lighting controller, and this will cause secondary problems such as impairment of circuit components.

Reversely, if an increasing lamp voltage is applied to the discharge lamp 4 in association with its life, secondary problems can arise such as explosion of the discharge lamp 4 due to the high voltage.

SUMMARY OF THE INVENTION

The present invention is implemented to solve the foregoing problems. It is therefore an object of the present invention to provide a discharge lamp lighting controller and discharge lamp socket, which can prevent excessive current from flowing under the constant power control of the discharge lamp.

According to a first aspect of the present invention, there is provided a discharge lamp lighting controller including a transformer having its primary coil connected to a DC power supply and its secondary coil operatively connected to a discharge lamp, the transformer producing across the secondary coil a voltage higher than a voltage applied to the primary coil; a switching device connected in series between the primary coil and the DC power supply; a voltage detector for detecting the voltage across the secondary coil as a lamp voltage in response to a state of the discharge lamp; and a control circuit for carrying out turn on and off control of the switching device in response to the lamp voltage to regulate power supplied to the discharge lamp.

Here, the control circuit may switch its control to reduce a lamp current supplied to the discharge lamp below a predetermined fixed value, if the lamp voltage goes out of a predetermined rated voltage range.

The control circuit may stop supplying power to the discharge lamp, if the lamp voltage goes out of the predetermined rated voltage range.

The discharge lamp lighting controller may further comprise warning means for issuing warning if the lamp voltage goes out of a predetermined rated voltage range.

The control circuit may further include a first memory for storing, if the lamp voltage goes out of a predetermined rated voltage range, information about that, and the control circuit may stop control for supplying power to the discharge lamp if the first memory stores the information.

The discharge lamp lighting controller may further include a discharge lamp socket for holding the discharge lamp and for detecting attachment and detachment of the discharge lamp to and from the socket, and a second memory for storing replacement of the discharge lamp.

The control circuit may carry out control for supplying power to the discharge lamp when the second memory stores information that the discharge lamp is replaced, even if the first memory stores information that the lamp voltage goes out of the predetermined rated voltage.

The discharge lamp socket may include a socket body for holding a discharge lamp; a concave which is formed in the socket body, and into which the discharge lamp is to be inserted; a movable member which is formed such that it protrudes to the concave and moves in response to attachment and detachment of the discharge lamp to and from the socket body; and a detector for producing a signal in response to movement of the movable member.

According to a second aspect of the present invention, there is provided a discharge lamp socket including a socket body for holding a discharge lamp; a concave which is formed in the socket body, and into which the discharge lamp is to be inserted; a movable member which is formed such that it protrudes to the concave and moves in response to attachment and detachment of the discharge lamp to and from the socket body; and a detector for producing a signal in response to movement of the movable member.

BRIEF DESCRIPTION OF THE DRAWINGS

FIG. 1 is a block diagram showing an embodiment 1 of a discharge lamp lighting controller in accordance with the present invention and its peripheral circuits;

FIG. 2 is a flowchart illustrating a lighting control operation by a CPU (central processing unit) in the embodiment 1;

FIG. 3 is a waveform diagram illustrating waveforms applied to the discharge lamp in a series of lighting control phases in the embodiment 1;

FIG. 11 is a block diagram showing an embodiment 7 of a discharge lamp lighting controller in accordance with the present invention and its peripheral circuits;

DETAILED DESCRIPTION OF THE PREFERRED EMBODIMENTS

Figure 4:
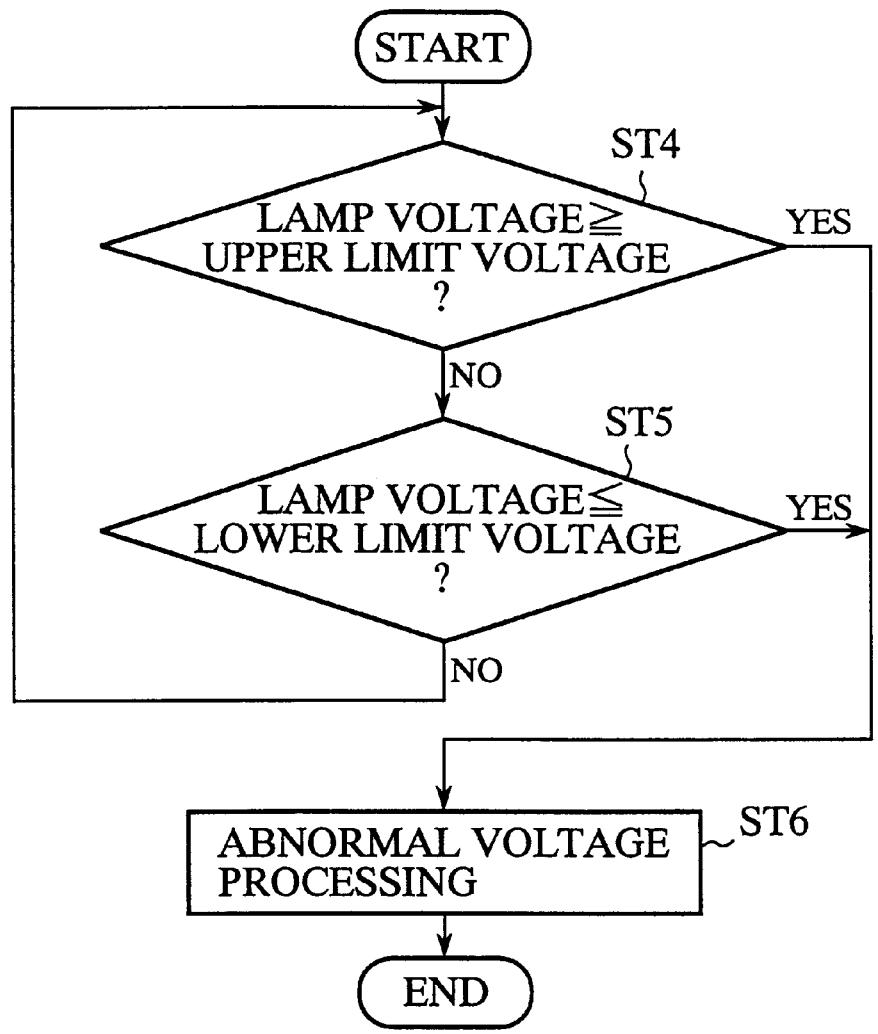
FIG. 4 is a flowchart illustrating interrupt processing executed by the CPU when an abnormal condition is detected during the series of the lighting control phases in the embodiment 1.

The invention will now be described with reference to the accompanying drawings.

EMBODIMENT 1

FIG. 1 is a block diagram showing and embodiment 1 of a discharge lamp lighting controller in accordance with the present invention and its peripheral circuits. In FIG. 1, the reference numeral 1 designates a DC power supply such as a battery mounted on a vehicle; 2 designates a DC-DC converter for multiplying a power supply voltage from the DC power supply 1 to output a high voltage; 3 designates a DC-AC inverter for converting the high voltage to an AC voltage; 4 designates a discharge lamp to which the AC voltage is applied; 5 designates an igniter circuit connected between the DC-AC inverter 3 and the discharge lamp 4 for generating a very high voltage by further boosting the high voltage for firing the discharge lamp 4; 6 designates a control circuit for controlling the DC-DC converter 2 to supply the discharge lamp 4 with a fixed amount of power; 7 designates a headlight switch connected between the DC power supply 1 and DC-DC converter 2; 26 designates a headlight warning lamp (warning means) that lights up in response to an illuminating signal from the control circuit 6; and 27 designates a buzzer (warning means) for making a warning sound in response to a warning signal from the control circuit 6.

The reference numeral 8 designates a transformer that has its primary coil connected to the DC power supply 1 and its secondary coil operatively connected to the discharge lamp 4 and generates across the secondary coil a voltage higher than a voltage applied to the primary coil; 9 designates a switching device connected in series between the primary coil and the DC power supply 1 to be turned on and off under the control of the control circuit 6; 10 each designates voltage detecting resistors (voltage detector) for detecting a voltage generated across the secondary coil in response to the state of the discharge lamp 4 as a lamp voltage; 11 designates a current detecting resistor for detecting a lamp current supplied to the discharge lamp 4 from the secondary coil; and 12–15 designate first to fourth transistors constituting a diode bridge controlled by the control circuit 6.

The reference numeral 16 designates a voltage AD (analog-to-digital) converter for converting the analog lamp voltage detected by the voltage detecting resistors 10 into digital voltage data VD; 17 designates a current AD converter for converting the analog lamp current detected by the current detecting resistor 11 into digital lamp current data ID; 18 designates a CPU (central processing unit) for generating a switching control signal SC for controlling the switching of the switching device 9 in response to the two digital data VD and ID; 19 designates a pulse generator for generating a pulse signal PS with a period and duty corresponding to the switching control signal SC; 21 designates a pullup resistor connected between the signal path of the pulse signal PS and the power supply voltage; 22 designates a transistor connected between the signal path of the pulse signal PS and the ground with its base supplied with a pulse output control signal PC from the CPU 18; 20 designates a bridge inverter for inverting a bridge control signal BC fed from the CPU 18 to the first to fourth transistors 12–15 to output an inverted bridge control signal; and 18a designates an involatile memory 18a (first memory) formed in the CPU 18.

Next, the operation of the present embodiment 1 will be described.

FIG. 2 is a flowchart illustrating a lighting control operation of the CPU 18 in the embodiment 1. The operation is started by turning the headlight switch 7 on. In FIG. 2, ST1 designates a firing step for carrying out control for firing arc discharges in the discharge lamp 4 by applying a voltage of about 20 kV; ST2 designates an electrode activation step for activating the electrodes of the discharge lamp 4 so that they can readily emit ions; and ST3 designates an illumination step for keeping the discharge lamp 4 to illuminate through a current path formed by the arc discharges.

The operation of individual steps will now be described.

In the firing step ST1, the CPU 18 supplies the switching control signal SC to the pulse generator 19 which produces the pulse signal PS in response to it. In the course of this, since the breakdown has not yet occurred in the discharge lamp, the secondary coil of the transformer 8 is open, and the power supply voltage of 12–24 V is boosted to about 400 V by the transformer 8. In parallel to this, the CPU 18 monitors the digital voltage data VD to decide whether the intended voltage is produced or not. In addition, the CPU 18 outputs the bridge control signal BC to bring the first and fourth transistors 12 and 15 of the diode bridge into conduction during the firing step ST1.

Thus, at the firing, the igniter circuit 5 operates in response to the high voltage of 400 V, boosts it to the very high voltage of 20 kV, and supplies it to the discharge lamp 4 in the preconducting state. The very high voltage of 20 kV thus applied across the two electrodes of the discharge lamp 4 induces gas breakdown and ion migration, which starts the light emission of the discharge lamp 4. Then, the igniter circuit 5 completes its operation, and the discharge lamp 4 becomes a load resistance through which a certain amount of current flows owing to the breakdown. Thus, a voltage produced by the discharge lamp 4 appears across the secondary coil of the transformer 8.

In the electrode activation step ST2, the CPU 18 controls after a comparatively long time period the bridge control signal BC to bring the second and third transistors 13 and 14 of the diode bridge into conduction, and maintains this state for another comparatively long time period. This activates the electrodes, thereby producing a state facilitating ionization.

In the lighting step ST3, the CPU 18 controls the switching control signal SC and alternates the bridge control signal BC at a predetermined cycle so that the discharge lamp 4 is supplied with the rated power. Thus continually supplied with a fixed amount of power, the discharge lamp 4 can illuminate over a long time period. The lighting step ST3 continues until the headlight switch 7 is turned off.

FIG. 3 is a waveform diagram showing waveforms supplied to the discharge lamp 4 in the series of the lighting control. As illustrated in FIG. 3, the very high voltage of about 20 kV is applied during the firing stage, a rather low voltage generated by the discharge lamp 4 is obtained across the electrodes for the comparatively long time periods during the electrode activation stage, and an AC voltage corresponding to the rated voltage generated by the discharge lamp 4 is supplied during the illumination stage. The AC voltage is used to operate the discharge lamp 4 because a DC power supply would activate only one of the electrodes of the discharge lamp 4, resulting in reduction of the amount of ions discharged from the electrode in a rather short time.

FIG. 4 is a flowchart illustrating an interrupt processing executed by the CPU 18 when a predetermined time has elapsed after the illumination started in the embodiment 1. In FIG. 4, ST4 designates a high voltage decision step, in which the CPU 18 makes a decision whether the lamp voltage is equal to or greater than the upper limit of the rated voltage, where the lamp voltage is determined by considering the digital voltage data VD, digital current data ID and the on-state resistance of the first to fourth transistors 12–15; ST5 designates a low voltage decision step, in which the CPU 18 makes a decision whether the lamp voltage is equal to or lower than the lower limit of the rated voltage; and ST6 designates an abnormal voltage processing step, in which if the lamp voltage was determined to be out of the rated range in one of the foregoing two steps, the CPU 18 makes a decision that the discharge lamp 4 is in an abnormal state, and carries out the abnormal voltage processing. The lamp voltage can be obtained by subtracting, from the digital voltage data VD representing the voltage across the secondary coil, a value obtained by multiplying the digital current data ID by the on-state resistance of the first to fourth transistors 12–15 and the like.

Figure 5:
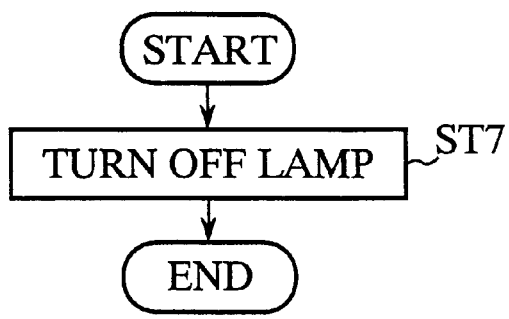
FIG. 5 is a flowchart illustrating the detail of the abnormal voltage processing step in the embodiment 1.

FIG. 5 is a flowchart illustrating the detail of the abnormal voltage processing step ST6 in the present embodiment 1. In FIG. 5, ST7 designates a turn-off step, in which the power supply to the discharge lamp 4 is halted. In the lamp turn-off step ST7, the CPU 18 changes the pulse output control signal PC from a low level to a high level to bring the pulse control transistor 22 into conduction. This causes a considerable amount of current to flow through the pullup resistor 21, thereby preventing the pulse signal PS from being supplied to the switching device 9. As a result, the secondary voltage of the transformer 8 is not generated, preventing the current from flowing through the secondary circuit.

As described above, the present embodiment 1 has such a configuration that the switching device 9 controls the current flowing through the primary coil of the transformer 8 to supply the fixed amount of power to the discharge lamp 4. As a result, it has an advantage of causing the discharge lamp 4 to emit light over a long time with the fixed amount of power.

Furthermore, since the discharge lamp 4 is supplied with the AC voltage through the first to fourth transistors 12–15, it can emit light without sacrificing its life. As a result, the present embodiment 1 has an advantage of making a maximum use of the long life characteristic of the discharge lamp 4.

Moreover, the discharge lamp 4 is turned off by stopping the pulse to the switching device 9 if the voltage across the secondary coil goes out of the rated voltage range. This makes it possible to prevent a current beyond the rated current estimated in the design stage from flowing even if variations in the amount of the gas filled in the tube of the discharge lamp 4 is greater than estimated, or the gas is gradually discharged from the tube. Accordingly, secondary problems can be prevented such as excessive current impairs the circuit components or a unduly high voltage damages the discharge lamp, which sometimes occur in the conventional discharge lamp lighting controller.

EMBODIMENT 2

Figure 6:
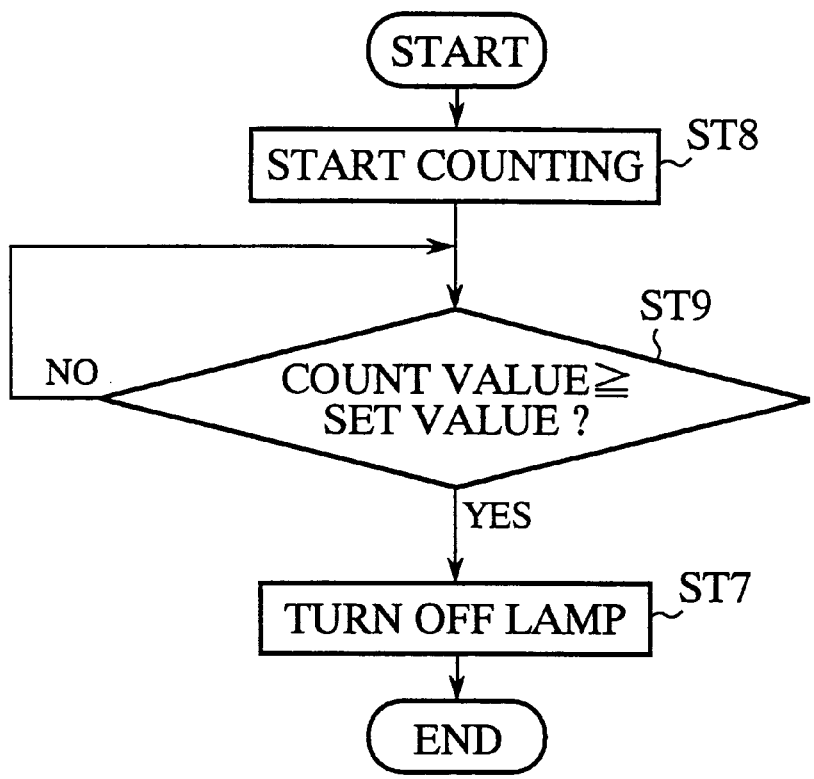
FIG. 6 is a flowchart illustrating the detail of the abnormal voltage processing step in an embodiment 2.

FIG. 6 is a flowchart illustrating the detail of the abnormal voltage processing step ST6 of an embodiment 2 in accordance with the present invention. In FIG. 6, ST8 designates a count start step for starting a timer embedded in the CPU 18; and ST9 designates a count value decision step for making a decision whether the count value of the timer exceeds a set value. Since the remaining portion is the same as that of the embodimemt 1, description thereof is omitted here by designating the corresponding portion by the same symbol.

The present embodiment 2 delays the turn-off of the discharge lamp 4 until a predetermined time period has elapsed after an abnormal lamp voltage is detected. Accordingly, it is not necessary for the vehicle to stop at once even if the abnormal lamp voltage is detected while it runs in the night, for example. Determining the set time shorter than a time period during which the circuit components are kept safe can prevent their damage without sacrificing the convenience.

EMBODIMENT 3

Figure 7:
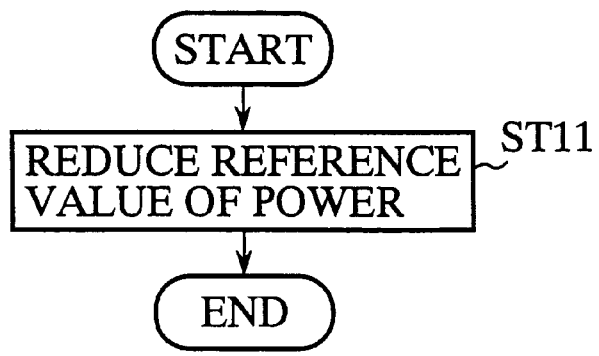
FIG. 7 is a flowchart illustrating the detail of the abnormal voltage processing step in an embodiment 3.

FIG. 7 is a flowchart illustrating the detail of the abnormal voltage processing step ST6 in an embodiment 3 in accordance with the present invention. In FIG. 7, S11 designates a dimming step for reducing the reference value of the constant power control of the CPU 18. Thus, the pulse width of the pulse signal PS is narrowed in the lighting processing after the dimming step ST11. Since the remaining portion is the same as that of the embodiment 1, the description thereof is omitted here.

Since the present embodiment 3 can narrow the pulse width of the pulse signal PS if the abnormal lamp voltage is detected, it is not necessary for the vehicle to turn off the light immediately even if the abnormal lamp voltage is detected during driving. Thus, the present embodiment 3 has an advantage that the vehicle can continue driving to its destination.

In addition, reduction in the current flowing through the secondary coil in the dimming processing enables the discharge lamp 4 to emit light below the rated current. This offers an advantage of preventing the circuit components from being impaired without sacrificing the convenience.

EMBODIMENT 4

Figure 8:
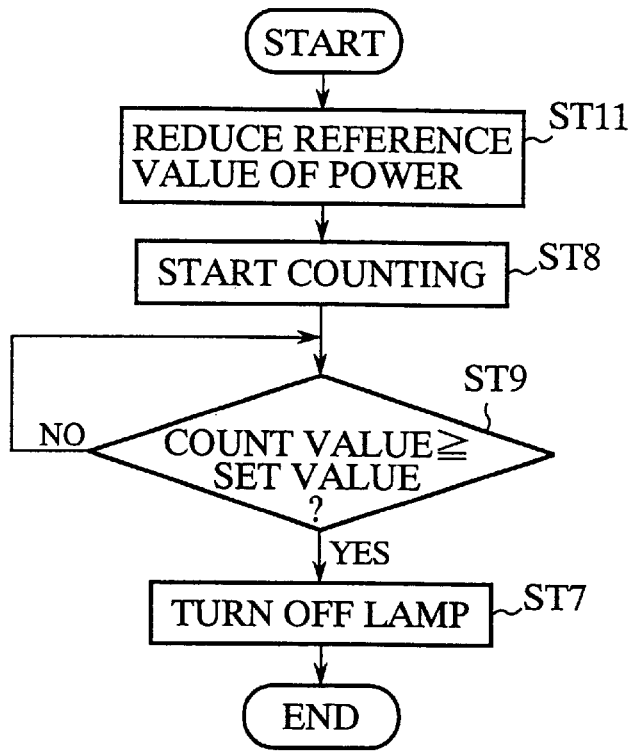
FIG. 8 is a flowchart illustrating the detail of the abnormal voltage processing step in an embodiment 4.

FIG. 8 is a flowchart illustrating the detail of the abnormal voltage processing step ST6 in an embodiment 4 in accordance with the present invention, in which the like steps are designated by the same symbols as those of FIGS. 6 and 7. Since the remaining portion is the same as that of the embodimemt 1, the description thereof is omitted here.

Since the present embodiment 4 can dim the discharge lamp 4 if the abnormal lamp voltage is detected, it is not necessary for the vehicle to stop as when turning off the light owing to the abnormal lamp voltage during driving. Thus, the present embodimemt 4 has an advantage of being able to continue driving of the vehicle to its destination.

Besides, since the discharge lamp 4 can continue to light up at such an amount of light that does not impair the circuit components until it is turned off after the predetermined time has elapsed, the vehicle can continue driving at a greater amount of light than in the embodiment 3.

Furthermore, the vehicle can achieve safe driving by stopping before the predetermined time. Thus, the present embodimemt 4 can prevent the circuit from being impaired without sacrificing the convenience during driving.

EMBODIMENT 5

Figure 9:
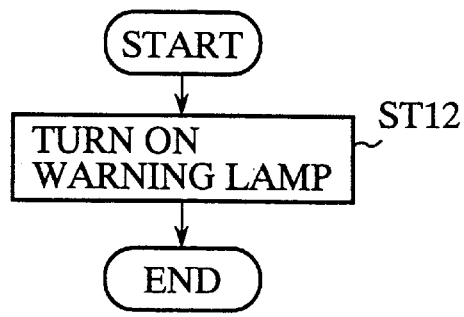
FIG. 9 is a flowchart illustrating the detail of the abnormal voltage processing step in an embodiment 5.

FIG. 9 is a flowchart illustrating the detail of the abnormal voltage processing step ST6 in an embodiment 5 in accordance with the present invention. In FIG. 9, ST12 designates a lamp turn-on step for lighting up the headlight warning lamp 26. Since the remaining portion is the same as that of the embodimemt 1, the description thereof is omitted here.

Since the headlight warning lamp 26 is lit when the abnormal lamp voltage is detected in the present embodiment 5, the driver of the vehicle can turn off the headlight switch 7 after stopping the driving. Thus, the present embodiment 5 has an advantage of being able to light up the lamp under the constant voltage control with preventing the circuit components from being impaired. In addition, identifying the failure of the discharge lamp, the user can positively replace it even in the daytime.

EMBODIMENT 6

Figure 10:
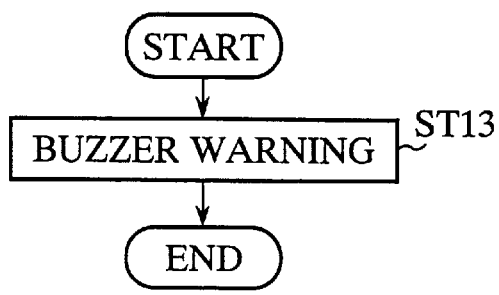
FIG. 10 is a flowchart illustrating the detail of the abnormal voltage processing step in an embodiment 6.

FIG. 10 is a flowchart illustrating the detail of the abnormal voltage processing step ST6 in an embodiment 6 in accordance with the present invention. In FIG. 10, ST13 designates a buzzer warning step in which the buzzer 27 issues a warning. Since the remaining portion is the same as that of the embodimemt 1, the description thereof is omitted here.

Since the buzzer 27 issues the warning when the abnormal lamp voltage is detected in the present embodiment 6, the driver of the vehicle can turn off the headlight switch 7 after stopping the vehicle. Thus, the present embodiment 6 has an advantage of being able to light up the lamp under the constant voltage control with preventing the impairment of the circuit components. In addition, identifying the failure of the discharge lamp, the user can positively replace it even in the daytime.

EMBODIMENT 7

FIG. 11 is a block diagram showing an embodiment 7 of the discharge lamp lighting controller in accordance with the present invention and its peripheral circuit. In FIG. 11, the reference numeral 23 designates a discharge lamp socket provided between the igniter circuit 5 and discharge lamp 4 to hold the discharge lamp 4 and to detect its attachment to or detachment from the socket, thereby outputting a lamp detection signal; 24 designates a replacement memory that makes a decision of replacement of the discharge lamp 4 in response to the lamp detection signal, and stores information on the lamp replacement; and 25 designates a backup power supply for operating the replacement memory 24 while the power supply of the vehicle is in the off state. The information stored in the replacement memory 24 is supplied to the CPU 18. Since the remaining portion is the same as that of the embodiment 1, the description thereof is omitted here by designating the like portions by the same reference numerals.

Figure 12A:
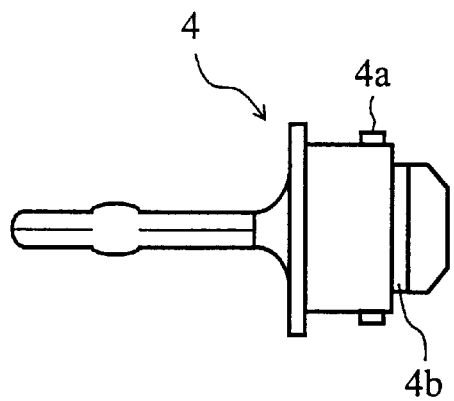
FIGS. 12A and 12B are a front view and a bottom view showing the external shape of a discharge lamp in the embodiment 7, respectively.
Figure 12B:
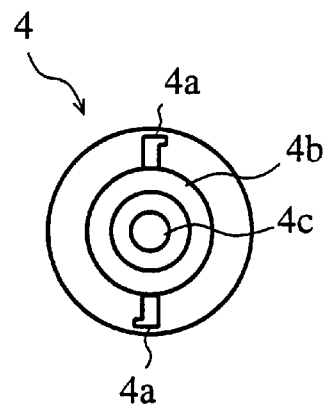

FIGS. 12A and 12B show the external shape of the discharge lamp 4 of the embodiment 7. In these figures, the reference numerals 4a's each designate a fastening member for fastening the discharge lamp 4 in the discharge lamp socket 23; the reference numeral 4b designates a ring-like contact connected to one of the electrode of the discharge lamp 4; and 4c designates a point contact that is disposed inside the ring-like contact 4b and is connected to the other electrode of the discharge lamp 4.

Figure 13:
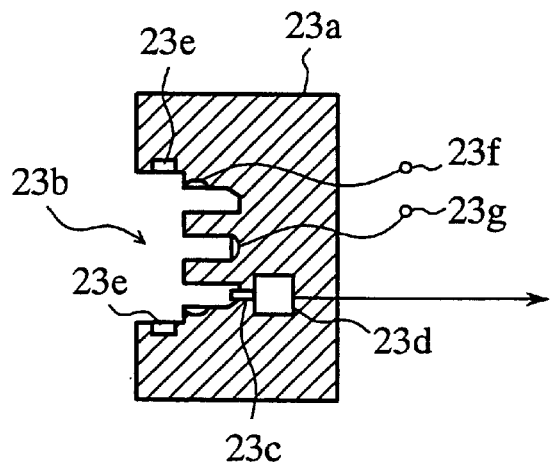
FIG. 13 is a cross-sectional view of a discharge lamp socket of the embodiment 7.

FIG. 13 is a cross-sectional view of the discharge lamp socket 23 of the present embodiment 7. In this figure, the reference numeral 23a designates a socket body for holding the discharge lamp 4; 23b designates a concave with an opening formed on one side of the socket body 23a to accept the discharge lamp 4; 23c designates a movable member provided such that it protrudes to the insertion concave 23b and moves in response to the attachment or detachment of the discharge lamp 4; 23d designates a detector for producing the lamp detection signal in response to the movement of the movable member 23c; 23e designates an engagement groove into which the fixing member 4a is engaged; and 23f and 23g designate power supply lines to be connected to the contacts 4b and 4c of the discharge lamp 4, respectively.

The discharge lamp 4 can be fastened in the discharge lamp socket 23 by inserting it into the insertion concave 23b through the opening and then by engaging the fixing member 4a with the engagement groove 23e by rotating the discharge lamp 4 a little. When the discharge lamp 4 is fastened, the movable member 23c is depressed by the ring-like contact 4b so that the attachment/detachment detector 23d changes the level of the lamp detection signal. Thus, the replacement memory 24 stores the lamp replacement information.

Next, the operation of the present embodiment 7 will be described.

Figure 14:
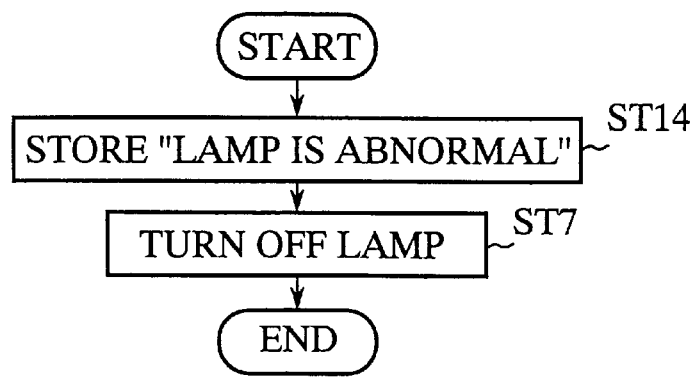
FIG. 14 is a flowchart illustrating the detail of the abnormal voltage processing step in the embodiment 7.

FIG. 14 is a flowchart illustrating the detail of the abnormal voltage processing step ST6 in the embodiment 7. In FIG. 14, ST14 designates an abnormality storing step for storing the abnormal lamp information in the involatile memory 18a in the CPU 18. Since the remaining portion is the same as that of the embodimemt 1, the description thereof is omitted here by designating the corresponding portions by the same reference numerals.

Figure 15:
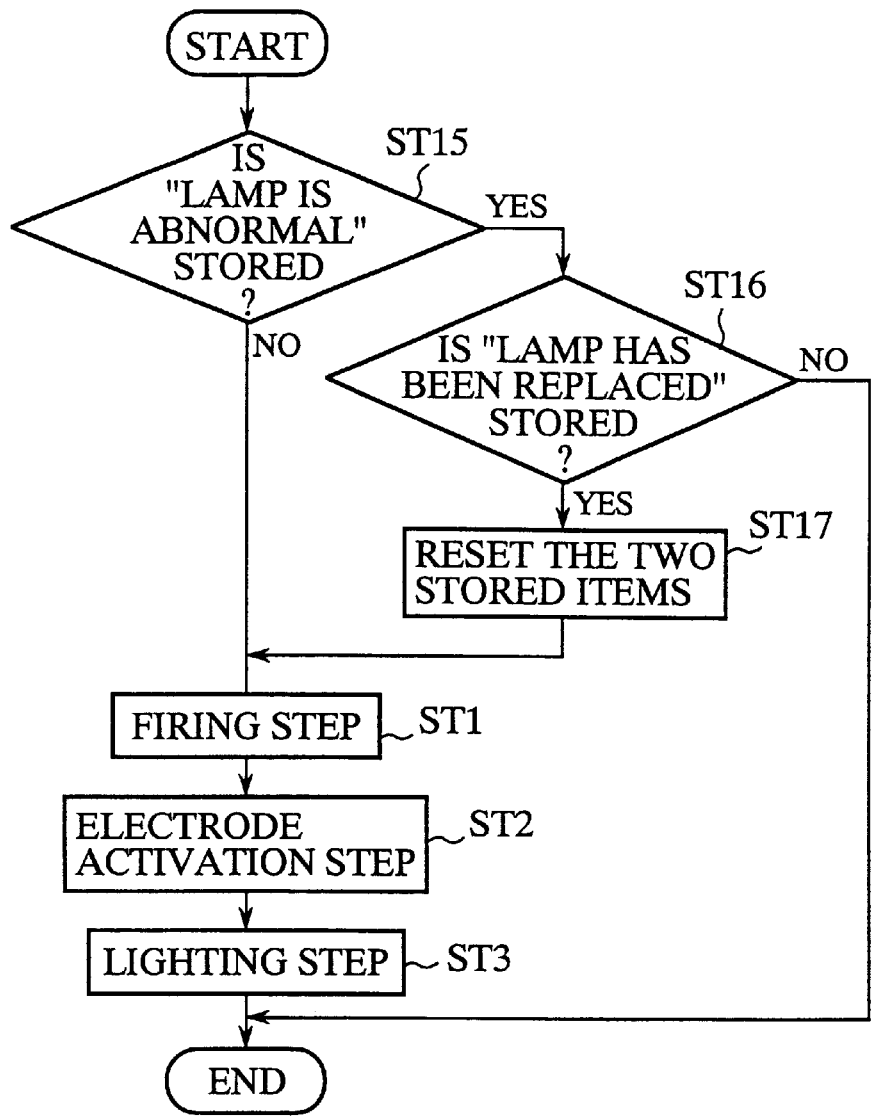
FIG. 15 is a flowchart illustrating a lighting control operation by the CPU (central processing unit) in the embodiment 7.
Figure 16:
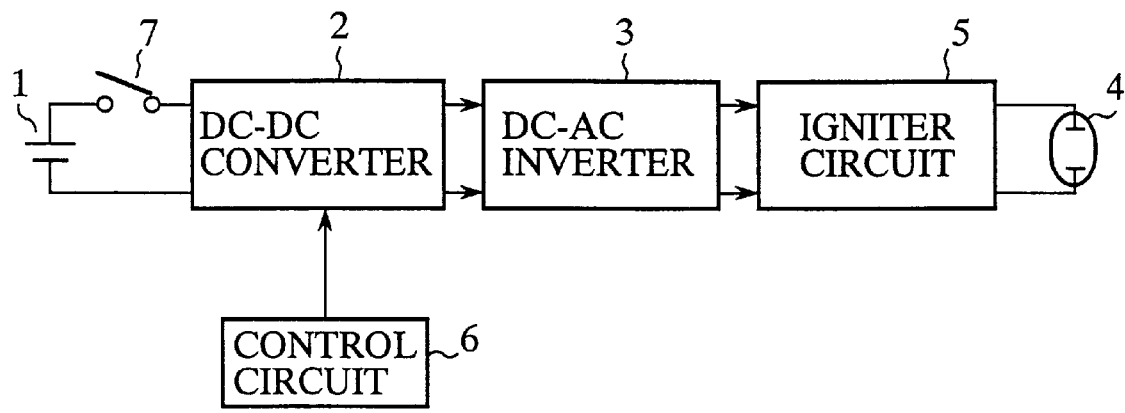
FIG. 16 is a block diagram showing a conventional discharge lamp lighting controller and its peripheral circuits.

FIG. 15 is a flowchart showing the lighting control operation by the CPU 18 in the present embodiment 7. In FIG. 15, ST15 designates a first memory decision step that makes a decision whether the involatile memory 18a stores the abnormal lamp information or not; ST16 designates a second memory decision step ST16 that makes a decision whether the replacement memory 24 stores the lamp replacement information or not; and ST17 designates a memory erasing step ST17 that resets the two storages. Since the remaining steps are the same to those of the embodimemt 1, the description thereof is omitted here by designating them by the same symbols.

If the CPU 18 makes a decision in the first memory decision step ST15 that the abnormal lamp information is not stored in the involatile memory 18a, it proceeds to the firing step ST1. On the contrary, if the CPU 18 makes a decision that the abnormal lamp information is stored in first memory decision step ST15, and that the lamp replacement information is also stored in the replacement memory 24 in second memory decision step ST16, the CPU 18 proceeds to the firing step ST1 via the memory erasing step ST17. If the CPU 18 makes a decision that the abnormal lamp information is stored in the first memory decision step ST15, and that the lamp replacement information is not stored in the second memory decision step ST16, the CPU 18 completes the lighting processing. The remaining processing is the same as that of the embodiment 1.

According to the present embodiment 7, if the control circuit 6 detects that the voltage across the secondary coil goes out of the rated voltage range, it turns off the lamp 4 with storing the information about that, and halts the next lighting control in accordance with the information. As a result, even if the discharge lamp lighting controller is activated again to relight the discharge lamp 4 after a state in which the excessive current can flow has once been established, the present embodiment 7 can positively prevent the excessive current, and hence protect the circuit components from being impaired owing to the relighting.

Furthermore, since the replacement of the discharge lamp 4 is automatically detected by the discharge lamp socket 23 that detects the attachment and detachment of the discharge lamp 4 and the replacement memory 24 that stores the information about that, it is enough for a user to replace the discharge lamp 4 to restore the normal state after the discharge lamp lighting controller has failed to light it. This offers an advantage of being able to recover it as conveniently as when a conventional halogen lamp is used.

What is claimed is:

1. A discharge lamp lighting controller comprising:
a transformer having its primary coil connected to a DC power supply and its secondary coil operatively connected to a discharge lamp, said transformer producing across the secondary coil a voltage higher than a voltage applied to the primary coil;
a switching device connected in series between the primary coil and the DC power supply;
a voltage detector for detecting the voltage across the secondary coil as a lamp voltage in response to a state of the discharge lamp; and
a control circuit for carrying out turn on and off control of said switching device in response to the lamp voltage to regulate power supplied to said discharge lamp,
wherein said control circuit determines that the discharge lamp is in an abnormal state if the lamp voltage goes out of a predetermined rated voltage range and carries out abnormal voltage processing including switching control to reduce a lamp current supplied to said discharge lamp below a predetermined fixed value when the lamp voltage is abnormal.

2. The discharge lamp lighting controller as claimed in claim 1, wherein said control circuit stops supplying power to said discharge lamp, if the lamp voltage goes out of the predetermined rated voltage range.

3. A discharge lamp lighting controller comprising:
a transformer having its primary coil connected to a DC power supply and its secondary coil operatively connected to a discharge lamp, said transformer producing across the secondary coil a voltage higher than a voltage applied to the primary coil;
a switching device connected in series between the primary coil and the DC power supply;
a voltage detector for detecting the voltage across the secondary coil as a lamp voltage in response to a state of the discharge lamp; and
a control circuit for carrying out turn on and off control of said switching device in response to the lamp voltage to regulate power supplied to said discharge lamp,
wherein said control circuit determines that the discharge lamp is in an abnormal state if the lamp voltage goes out of a predetermined rated voltage range and carries out abnormal voltage processing including issuing a warning when the lamp voltage is abnormal.

4. A discharge lamp lighting controller comprising:
a transformer having its primary coil connected to a DC power supply and its secondary coil operatively connected to a discharge lamp, said transformer producing across the secondary coil a voltage higher than a voltage applied to the primary coil;
a switching device connected in series between the primary coil and the DC power supply;
a voltage detector for detecting the voltage across the secondary coil as a lamp voltage in response to a state of the discharge lamp; and
a control circuit for carrying out turn on and off control of said switching device in response to the lamp voltage to regulate power supplied to said discharge lamp,
wherein said control circuit determines that the discharge lamp is in an abnormal state if the lamp voltage goes out of a predetermined rated voltage range and carries out abnormal voltage processing including storing information about the abnormal state in a first memory when the lamp voltage is abnormal and said control circuit stops control for supplying power to said discharge lamp if said first memory stores said information.

5. The discharge lamp lighting controller as claimed in claim 4, further comprising a discharge lamp socket for holding said discharge lamp and for detecting attachment and detachment of said discharge lamp to and from said socket, and a second memory for storing replacement of said discharge lamp.

6. The discharge lamp lighting controller as claimed in claim 5, wherein said control circuit carries out control for supplying power to said discharge lamp when said second memory stores information that said discharge lamp is replaced, even if said first memory stores information that the lamp voltage goes out of the predetermined rated voltage.

7. The discharge lamp lighting controller as claimed in claim 6, wherein said discharge lamp socket comprising:

a socket body for holding a discharge lamp;

a concave which is formed in said socket body, and into which said discharge lamp is to be inserted;

a movable member which is formed such that it protrudes to said concave and moves in response to attachment and detachment of said discharge lamp to and from said socket body; and a detector for producing a signal in response to movement of said movable member.

* * * * *